(12) United States Patent
Denoue et al.

(10) Patent No.: US 11,087,068 B2
(45) Date of Patent: Aug. 10, 2021

(54) SYSTEMS AND METHODS FOR BRINGING DOCUMENT INTERACTIONS INTO THE ONLINE CONVERSATION STREAM

(71) Applicant: FUJIFILM Business Innovation Corp., Tokyo (JP)

(72) Inventors: Laurent Denoue, Verona (IT); Scott Carter, Menlo Park, CA (US); Matthew L. Cooper, San Francisco, CA (US); Jennifer Marlow, Palo Alto, CA (US)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 235 days.

(21) Appl. No.: 15/339,910

(22) Filed: Oct. 31, 2016

(65) Prior Publication Data
US 2018/0121394 A1 May 3, 2018

(51) Int. Cl.
*G06F 40/106* (2020.01)
*H04L 12/58* (2006.01)
(Continued)

(52) U.S. Cl.
CPC ............ *G06F 40/106* (2020.01); *G06F 3/013* (2013.01); *G06F 3/04812* (2013.01);
(Continued)

(58) Field of Classification Search
CPC .... G06F 17/212; G06F 3/013; G06F 3/04812; G06F 3/167; G06F 40/106; H04L 51/04; H04L 51/02; H04L 51/16
See application file for complete search history.

(56) References Cited

U.S. PATENT DOCUMENTS

| | | | | |
|---|---|---|---|---|
| 9,477,375 B1* | 10/2016 | Lewis | ................. | G06F 3/04817 |
| 2005/0188016 A1* | 8/2005 | Vdaygiri | ................ | G06Q 10/10 |
| | | | | 709/205 |

(Continued)

FOREIGN PATENT DOCUMENTS

| JP | 2008217059 A | 9/2008 |
|---|---|---|
| JP | 2016126445 A | 7/2016 |

OTHER PUBLICATIONS

Laurent Denoue, Scott Carter, and Matthew Cooper. 2015. Searching Live Meeting Documents "Show me the Action". In Proceedings of the 2015 ACM Symposium on Document Engineering (DocEng '15). ACM, New York, NY, USA, 195-198. DOI=http://dx.doi.org/10.1145/2682571.2797082.

(Continued)

*Primary Examiner* — Tan H Tran
(74) *Attorney, Agent, or Firm* — Procopio, Cory, Hargreaves & Savitch LLP (57) ABSTRACT

System that automatically embeds interactive document snippets inside chat conversation stream. Specifically, described are techniques to automatically crop meaningful areas on document pages based on users' actions and underlying content to embed them inside chat window. Embedded snippets are easy to view because smart cropping provides viewers enough context. Snippets are playable inside the chat window so users can view the snippet without having to open the corresponding document. Importantly, viewers can reply inline to a document snippet, also without having to open the original document page. Like traditional text messages, snippets are appended to the conversation chat window, allowing co-workers to see what was added. When users choose to focus on document itself (as opposed to working inside the chat window only), the system automatically shows all relevant document snippets as well as (Continued)

chat messages, helping the person quickly see what conversations happened around this part of the document.

24 Claims, 7 Drawing Sheets

(51) Int. Cl.
*G06F 3/01* (2006.01)
*G06F 3/0481* (2013.01)
*G06F 3/16* (2006.01)

(52) U.S. Cl.
CPC .............. *G06F 3/167* (2013.01); *H04L 51/02* (2013.01); *H04L 51/16* (2013.01); *H04L 51/04* (2013.01)

(56) References Cited

U.S. PATENT DOCUMENTS

| | | | | |
|---|---|---|---|---|
| 2007/0112916 | A1* | 5/2007 | Singh | H04W 4/12 709/206 |
| 2009/0013265 | A1 | 1/2009 | Cole et al. | |
| 2009/0249223 | A1* | 10/2009 | Barsook | G06F 3/048 715/753 |
| 2010/0185951 | A1* | 7/2010 | Nichols | H04L 65/4015 715/738 |
| 2013/0047072 | A1* | 2/2013 | Bailor | G06F 17/2288 715/234 |
| 2013/0083210 | A1* | 4/2013 | Beckham | H04N 21/2743 348/207.11 |
| 2013/0212470 | A1* | 8/2013 | Karunamuni | G06F 40/166 715/243 |
| 2014/0136990 | A1* | 5/2014 | Gonnen | H04L 51/18 715/752 |
| 2014/0143645 | A1* | 5/2014 | Chub | G06F 17/2235 715/230 |
| 2016/0197872 | A1* | 7/2016 | Khattar | H04L 51/32 709/206 |
| 2016/0344828 | A1* | 11/2016 | Hausler | G06F 16/9535 |
| 2017/0024120 | A1* | 1/2017 | Shunock | G06F 3/04812 |
| 2018/0024730 | A1* | 1/2018 | Jambou | G06F 3/04847 |

OTHER PUBLICATIONS

Patrick Chiu and Lynn Wilcox. 1998. A dynamic grouping technique for ink and audio notes. In Proceedings of the 11th annual ACM symposium on User interface software and technology (UIST '98). ACM, New York, NY, USA, 195-202. DOI: http://dx.doi.org/10.1145/288392.288605.

Susan R. Fussell, Leslie D. Setlock, Jie Yang, Jiazhi Ou, Elizabeth Mauer, and Adam DI Kramer. 2004. Gestures over video streams to support remote collaboration on physical tasks. Human-Computer Interaction 19, 3: 273-309.

K. Gupta, G. Lee, and M. Billinghurst. 2016. Do You See What I See? The Effect of Gaze Tracking. IEEE Transactions on Visualization and Computer Graphics pp. 99: 1-1. http://doi.org/10.1109/TVCG.2016.2593778.

Deepak Akkil and Poika Isokoski. 2016. Gaze Augmentation in Egocentric Video Improves Awareness of Intention. 1573-1584. http://doi.org/10.1145/2858036.2858127.

Morgan N. Price, Bill N. Schilit, and Gene Golovchinsky. 1998. XLibris: the active reading machine. In CHI 98 Conference Summary on Human Factors in Computing Systems (CHI '98). ACM, New York, NY, USA, 22-23. DOI: http://dx.doi.org/10.1145/286498.286510.

Kerry Rodden, Xin Fu, Anne Aula, and Ian Spiro. 2008. Eye-mouse coordination patterns on web search results pages. In CHI '08 Extended Abstracts on Human Factors in Computing Systems (CHI EA '08). ACM, New York, NY, USA, 2997-3002. DOI=http://dx.doi.org/10.1145/1358628.1358797.

Mon Chu Chen, John R. Anderson, and Myeong Ho Sohn. 2001. What can a mouse cursor tell us more?: correlation of eye/mouse movements on web browsing. In CHI '01 Extended Abstracts on Human Factors in Computing Systems (CHI EA '01). ACM, New York, NY, USA, 281-282. DOI=http://dx.doi.org/10.1145/634067.634234"Quip, The living Document" http://quip.com.

Elizabeth F. Churchill, Jonathan Trevor, Sara Bly, Les Nelson, and Davor Cubranic. 2000. Anchored conversations: chatting in the context of a document. In Proceedings of the SIGCHI conference on Human Factors in Computing Systems (CHI '00). ACM, New York, NY, USA, 454-461. DOI=http://dx.doi.org/10.1145/332040.332475.

Nagy, G., Seth, S., Viswanathan, M.: A prototype document image analysis system for technical journals. Computer 7 (1992) 10-22.

Dongwook Yoon, Nicholas Chen, Bernie Randles, et al. 2016. RichReview++: Deployment of a Collaborative Multi-modal Annotation System for Instructor Feedback and Peer Discussion. In Proceedings of the 19th ACM Conference on Computer-Supported Cooperative Work & Social Computing, 195-205. Retrieved Aug. 29, 2016 from http://dl.acm.org/citation.cfm?id=2819951.

Michael N. Wallick and Rachel M. Fleck and Michael L. Gleicher, Marker and Chalkboard Regions, In Proceedings of Mirage 2005, INRIA Rocquencourt, France, Mar. 1-2, 2005.

Notice of Reasons for Refusal for related JP App No. 2017-128507 dated Apr. 2, 2021, 8 pgs.

* cited by examiner

SYSTEMS AND METHODS FOR BRINGING DOCUMENT INTERACTIONS INTO THE ONLINE CONVERSATION STREAM

BACKGROUND OF THE INVENTION

Technical Field

The disclosed embodiments relate in general to remote interaction between people using computer networks and, more specifically, to systems and methods for bringing document interactions into the online conversation stream.

Description of the Related Art

Previous work has approached document collaboration using two distinct metaphors: document centric or conversation centric. With conversation-centric approaches, conversations happen outside of the document; typically, users email the document as attachment and conversation happens outside by email or chat applications such as Slack, well known to persons of ordinary skill in the art, where users can link to a document but the conversation still happens outside of the document. The advantage of this approach is that conversations can bring in different documents. However, users have no means to bring comments they make over the document inside the conversation. Users are forced to make up references such as "I don't agree with bullet 3 on slide 4" of this PPT. Therefore, such communication is hard to follow. One counter example is Kifi1, well known to persons of ordinary skill in the art, allowing users to embed references to parts of a web page inside a chat window that lives beyond the currently viewed web page.

At the other end, document-centric approaches embed conversations inside one document, in the form of comments, as it is accomplished in Word, Google Docs, well-known to persons of ordinary skill in the art, as well as chat boxes, as it is performed in Quip and Google Docs, both of which are also well-known to persons of ordinary skill in the art. Some well-known research tools such as StickyChats available from Fuji Xerox Palo Alto Laboratory and described in Elizabeth F. Churchill, Jonathan Trevor, Sara Bly, Les Nelson, and Davor Cubranic, 2000, Anchored conversations: chatting in the context of a document. In Proceedings of the SIGCHI conference on Human Factors in Computing Systems (CHI '00), ACM, New York, N.Y., USA, 454-461, further allow users to pin conversational chat boxes to specific places of a Word document. Document-centric approaches focus on one document at a time, and thus do not support well the modern workflow where many documents and document types, such as Word, Excel, code snippets, images, etc., are often used during real work.

Additionally, supporting deictic reference over video conferencing is an important way to help people ground their conversation in the absence of being face to face. One study on remote help giving found that pointing towards objects or locations made up 75% of all remote instructions being given, as described in detail in Susan R. Fussell, Leslie D. Setlock, Jie Yang, Jiazhi Ou, Elizabeth Mauer, and Adam D I Kramer, 2004, Gestures over video streams to support remote collaboration on physical tasks. Human-Computer Interaction 19, 3: 273-309. Eye gaze is a useful additional cue to add richer information about areas of focus because it carries cues about the user's intentions, see, for example, Deepak Akkil and Poika Isokoski, 2016, Gaze Augmentation in Egocentric Video Improves Awareness of Intention, 1573-1584. A recent experiment comparing pointing and eye tracking in a remote-help situation found that performance and perceived social presence were the best when pointing and eye gaze information were combined (compared to only one of these cues on its own), see, for example, K. Gupta, G. Lee, and M. Billinghurst, 2016, Do You See What I See? The Effect of Gaze Tracking, IEEE Transactions on Visualization and Computer Graphics PP, 99: 1-1.

Therefore, as would be appreciated by those of skill in the art, new and improved systems and methods for enabling users to seamlessly interact with multiple document types are needed.

SUMMARY OF THE INVENTION

The embodiments described herein are directed to methods and systems that substantially obviate one or more of the above and other problems associated with conventional techniques for document interaction in online conversation streams.

In accordance with one aspect of the inventive concepts described herein, there is provided a computer-implemented method, the method being performed in a computerized system incorporating a central processing unit and a memory, the computer-implemented method involving: detecting one or more actions of a user in connection with a document; analyzing a content of the document; analyzing a layout of the document; automatically generating a playable document page snippet based on the detected one or more actions of the user in connection with the document, the analyzed document content and analyzed document layout; and inserting the automatically generated playable document page snippet into a conversation stream associated with the document.

In one or more embodiments, the detected user action is a mouse pointer hover by the user over at least a portion of the document.

In one or more embodiments, the detected user action is a text entry by the user in connection with the document.

In one or more embodiments, the detected user action is a voice comment by the user in connection with the document.

In one or more embodiments, the detected user action is a gaze by the user in connection with the document.

In one or more embodiments, the conversation stream associated with the document is displayed in a chat window.

In one or more embodiments, the automatically generated playable document page snippet is a composite snippet comprising two or more portions of the document corresponding to actions of the user that are semantically linked.

In one or more embodiments, the method further comprises displaying and playing the automatically generated playable document page snippet inside the conversation stream without opening a separate viewer of the document.

In one or more embodiments, the method further comprises enabling the user to reply to the automatically generated playable document page snippet inside the conversation stream without opening a separate viewer for the document.

In one or more embodiments, the method further comprises grouping together the automatically generated playable document page snippet and corresponding detected one or more actions of the user in connection with the document.

In one or more embodiments, the method further comprises filtering related snippets and corresponding detecting one or more actions of a user when the user focuses on a viewer of the document.

In one or more embodiments, the actions from a plurality of users over the same page area of the document are grouped using an overlay resulting in a single snippet comprising the actions of the plurality of users.

In one or more embodiments, the detected user action is a pointer motion by the user over at least a portion of the document, wherein the pointer motion is smoothed when the pointer motion is acquired at low sampling rate and wherein the smoothing comprises inserting fake text cursors based on an underlying text connected components or document object model of the document.

In accordance with another aspect of the inventive concepts described herein, there is provided a non-transitory computer-readable medium embodying a set of computer-executable instructions, which, when executed in connection with a computerized system incorporating a central processing unit and a memory, cause the computerized system to perform a method comprising: detecting one or more actions of a user in connection with a document; analyzing a content of the document; analyzing a layout of the document; automatically generating a playable document page snippet based on the detected one or more actions of the user in connection with the document, the analyzed document content and analyzed document layout; and inserting the automatically generated playable document page snippet into a conversation stream associated with the document.

In one or more embodiments, the detected user action is a mouse pointer hover by the user over at least a portion of the document.

In one or more embodiments, the detected user action is a text entry by the user in connection with the document.

In one or more embodiments, the detected user action is a voice comment by the user in connection with the document.

In one or more embodiments, the detected user action is a gaze by the user in connection with the document.

In one or more embodiments, the conversation stream associated with the document is displayed in a chat window.

In one or more embodiments, the automatically generated playable document page snippet is a composite snippet comprising two or more portions of the document corresponding to actions of the user that are semantically linked.

In one or more embodiments, the method further comprises displaying and playing the automatically generated playable document page snippet inside the conversation stream without opening a separate viewer of the document.

In one or more embodiments, the method further comprises enabling the user to reply to the automatically generated playable document page snippet inside the conversation stream without opening a separate viewer for the document.

In one or more embodiments, the method further comprises grouping together the automatically generated playable document page snippet and corresponding detected one or more actions of the user in connection with the document.

In one or more embodiments, the method further comprises filtering related snippets and corresponding detecting one or more actions of a user when the user focuses on a viewer of the document.

In one or more embodiments, the actions from a plurality of users over the same page area of the document are grouped using an overlay resulting in a single snippet comprising the actions of the plurality of users.

In one or more embodiments, the detected user action is a pointer motion by the user over at least a portion of the document, wherein the pointer motion is smoothed when the pointer motion is acquired at low sampling rate and wherein the smoothing comprises inserting fake text cursors based on an underlying text connected components or document object model of the document In accordance with yet another aspect of the inventive concepts described herein, there is provided a computerized system incorporating a central processing unit and a memory, the memory storing a set of computer-readable instructions causing the computerized system to perform a method involving: detecting one or more actions of a user in connection with a document; analyzing a content of the document; analyzing a layout of the document; automatically generating a playable document page snippet based on the detected one or more actions of the user in connection with the document, the analyzed document content and analyzed document layout; and inserting the automatically generated playable document page snippet into a conversation stream associated with the document.

In one or more embodiments, the detected user action is a mouse pointer hover by the user over at least a portion of the document.

In one or more embodiments, the detected user action is a text entry by the user in connection with the document.

In one or more embodiments, the detected user action is a voice comment by the user in connection with the document.

In one or more embodiments, the detected user action is a gaze by the user in connection with the document.

In one or more embodiments, the conversation stream associated with the document is displayed in a chat window.

In one or more embodiments, the automatically generated playable document page snippet is a composite snippet comprising two or more portions of the document corresponding to actions of the user that are semantically linked.

In one or more embodiments, the method further comprises displaying and playing the automatically generated playable document page snippet inside the conversation stream without opening a separate viewer of the document.

In one or more embodiments, the method further comprises enabling the user to reply to the automatically generated playable document page snippet inside the conversation stream without opening a separate viewer for the document.

In one or more embodiments, the method further comprises grouping together the automatically generated playable document page snippet and corresponding detected one or more actions of the user in connection with the document.

In one or more embodiments, the method further comprises filtering related snippets and corresponding detecting one or more actions of a user when the user focuses on a viewer of the document.

In one or more embodiments, the actions from a plurality of users over the same page area of the document are grouped using an overlay resulting in a single snippet comprising the actions of the plurality of users.

In one or more embodiments, the detected user action is a pointer motion by the user over at least a portion of the document, wherein the pointer motion is smoothed when the pointer motion is acquired at low sampling rate and wherein the smoothing comprises inserting fake text cursors based on an underlying text connected components or document object model of the document Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

To address the above and other problems associated with the conventional technology, one or more embodiments described herein implement a system and method wherein users can seamlessly interact with multiple document types. The term document as used herein refers to any type of documents known in the art, including, without limitation, paper (physical) documents, electronic documents, text documents, images, photographs, drawings, renderings, or any other type of content. Therefore, the embodiments described herein are not limited to any specific types of documents or content thereof. Any specific document types used herein to illustrate the embodiments of the invention should be considered as exemplary only and not limiting the invention in any manner what so ever.

In one or more embodiments, their interactions are automatically detected and added to the conversation stream along with regular text messages. Specifically, given a set of actions detected by the system as users interact with one or more document pages (mouse, text, voice, gaze and scroll input events), the described system automatically clusters the actions into meaningful snippets using the following multimodal approach:

The mouse location, speed (including dwell time) is used to compute importance of the motion;

The underlying content (e.g. column, figure) is used to intelligently extend the snippet crop box; and The user's attention (such as eye gaze when available through the webcam during a teleconferencing session) and user's voice is utilized to further distinguish erratic cursor motions versus intentionally communicative ones.

Figure 1:
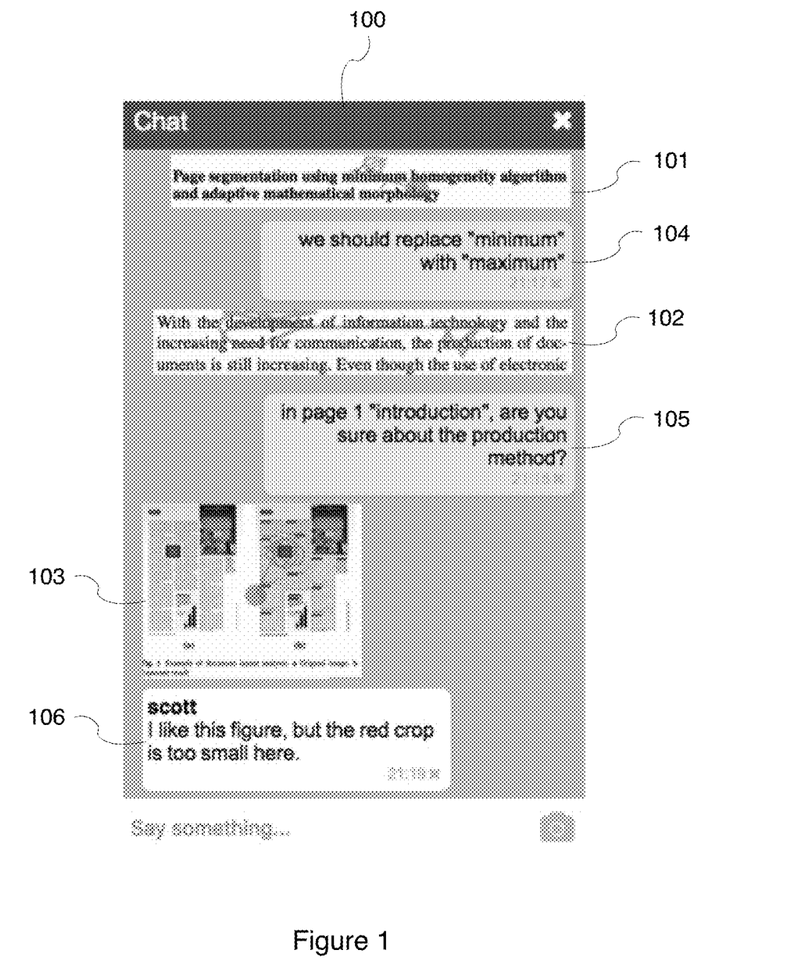
FIG. 1 illustrates three snippets corresponding to user's interactions with one or more pages and documents that are inserted into the chat window.

In one or more embodiments, using these signals, the described novel algorithm intelligently crops the corresponding parts of the document page(s) into a multimedia snippet. Each obtained multimedia snippet is inserted into the user's chat application of choice. One exemplary embodiment of the described system provides a custom chat window part of a teleconferencing tool as a clickable image, as illustrated in FIG. 1. Specifically, FIG. 1 illustrates three snippets 101, 102 and 103, corresponding to user's interactions with one or more pages and documents that are inserted into the chat window 100. In one embodiment, once the aforesaid snippets 101, 102 and 103 have been inserted, anyone can replay the snippets. For example, FIG. 1 shows user interaction with the snippets 101, 102 and 103, as indicated by the circles showing there's a mouse action to be played back. In the shown example, any user privy to the chat can reply the aforesaid mouse interaction of other users. In addition, anyone can also reply to a snippet inline (without having to open the document), as indicated by the chat messages 104, 105 and 106, see FIG. 1.

In one or more embodiments, within the chat window 100, the user can click on any snippet 101, 102 or 103 and see its actions played back, inline inside the chat window 100 without having to open the document page. In one or more embodiments, users can also create new actions over this snippet by recording their mouse, keyboard and voice, thus creating a new snippet that is inserted inside the chat window 100. Document interactions become first-class citizens like traditional text-based messages.

Additionally or alternatively, users are enabled to choose to open the document itself to see the full view along with the playable actions, including, without limitation, mouse actions, highlights, ink strokes as well as voice comments. As would be appreciated by persons of ordinary skill in the art, when a user focuses on the document, it is natural to see the corresponding relevant chat snippets 101, 102 and 103 and messages 104, 105 and 106. The system thus presents them by automatically filtering the chat window 100 sitting next to the document (not shown), optionally synchronizing the list with the document page being read. In other words, the described novel technique allows the system to contextually treat regular text messages such as "slide 4 I don't agree" whenever page 4 is shown in the document viewer.

Intelligent Snippet Creation

Motivations

Figure 2:
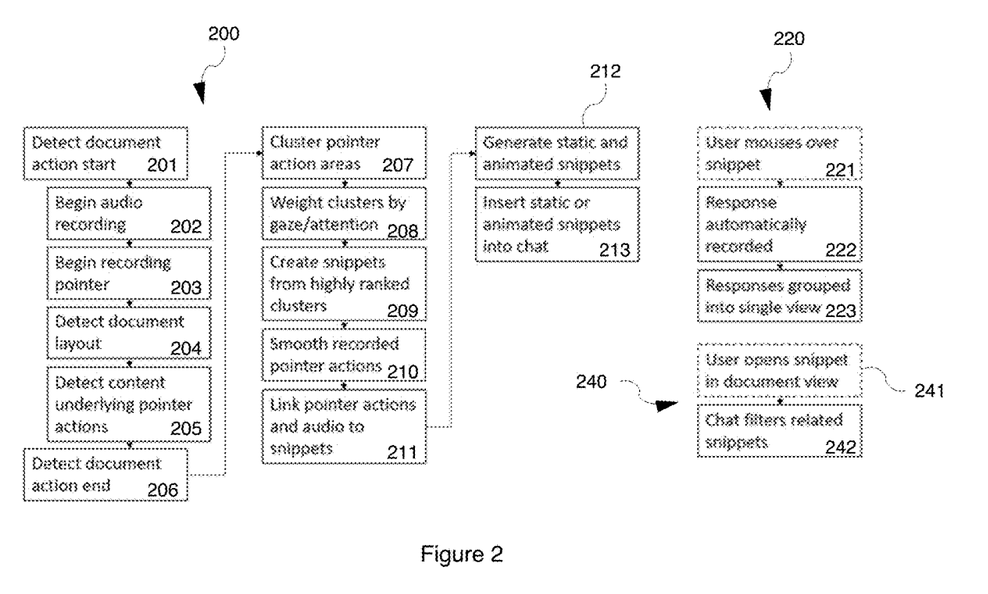
FIG. 2 illustrates three exemplary flowcharts explaining how snippets are created based on user's actions, how they are inserted and how users can interact with the snippets in accordance with an embodiment of the described novel approach.

FIG. 2 illustrates three exemplary flowcharts 200, 220 and 240 explaining how snippets are created based on user's actions, how they are inserted and how users can interact with the snippets in accordance with an embodiment of the described novel approach. Specifically, at step 201 of the flowchart 200, the document action start is detected, see FIG. 2. At step 202, the system begins audio recording of the comments made by the users. At step 203, the system begins recording the positions of the mouse cursor or other pointer. At step 204, the system detects document layout. At step 205, the system detects the content underlying pointer actions. At step 206, the system detects the end of the document action by the user. At step 207, the pointer action areas are clustered. At step 208, the resulting clusters are weighed by means of user's gaze and attention. At step 209, the system creates snippets using highly ranked clusters. At step 210, the system performs smoothing the recorded pointer (e.g. mouse cursor) actions, when they are acquired at a low sampling rate. At step 211, the system links pointer actions and corresponding audio to the respective snippets. At step 212, the system generates static and animated snippets. Finally, at step 213, the system inserts the generated static or animated snippets into the chat window.

With reference to the flowchart 220, at step 221 the user hovers mouse cursor over the snippet. At step 222, the user response is automatically recorded. At step 223, the user responses are grouped into a single view.

Finally, with reference to the flowchart 240, the user opens the snippet in a document view, see step 241. At step 242, the chat automatically filters the related snippets.

In one embodiment, the described system gathers mouse positions and uses document layout analysis to determine the spatial extent of actions over a document page. Without intelligent segmentation of user's actions, the system would end up creating snippets that potentially cover the whole document page. Instead, in one embodiment, the system seeks to find meaningful areas over the document page in order to cut them out and insert them into the conversation stream. This requires integrating automatic understanding of both the underlying document content as well as the user's interactions. Cropping also allows users to read the contents of the snippets inside the chat window without having to view the original document pages.

Layout Analysis

One exemplary embodiment uses the XY-Cut algorithm described in Nagy, G., Seth, S., Viswanathan, M.: A prototype document image analysis system for technical journals, Computer 7 (1992) 10-22, to detect text boxes, text lines, paragraphs and columns. In one embodiment, this algorithm is implemented in Javascript, well known to persons of ordinary skill in the art. Figures, tables and graphs are detected by removing text boxes from the binarized image and finding lines (currently tables and math formulas not bounded by or containing lines are not detected but state of the art methods can be applied). Other clustering and grouping techniques can also be used for content other than conventional text documents, as described, for example, in U.S. Patent Application Publication No. US 2014-0245152 A1, entitled "SYSTEMS AND METHODS FOR CONTENT ANALYSIS TO SUPPORT NAVIGATION AND ANNOTATION IN EXPOSITORY VIDEOS." In a given text run (e.g. column), one embodiment further splits the run into sub-paragraphs when it detects a line indentation, detected as having a starting X greater than the X of the average lines in that text-run.

Content Analysis

As would be appreciated by persons of ordinary skill in the art, some documents, such as source code shown in a text editor, may not contain much variety in their layout. In this situation, an embodiment of the described system also performs content analysis to determine the snippet crop area based on textual content, obtained using the Document Object Model (DOM) or with Optical Character Recognition (OCR), both of which are well known to persons of ordinary skill in the art. For example, if a user is sharing source code in a text editor and moves her text cursor over a Javascript function, the system automatically crops the snippet above and below this function name, clipping out the other parts of the page. In a word processing document, the system can crop the snippet at the beginning and end of a sentence or paragraph. This content-based cropping is used in the segmentation algorithm described below when a user gestures over a long column of text, where a pure layout-based approach would fail.

Segmentation Algorithm

In one embodiment, document-mouse interaction data consists of a long path of time-stamped (X,Y,t) triples indicative of the position of the mouse cursor on the document at any given time. Using the layout analysis described above, which involves line indentation detections that splits long text runs into sub-rectangles:

1) an embodiment of the system segments the path whenever a segment (X1,Y1) (X2,Y2) crosses an element of the detected layout. For example, if the user moves the cursor from a text paragraph in column one of the document to column two, an embodiment of the system splits the path in two sub-paths;
2) an embodiment of the system further considers content-based analysis to split remaining paths into sub-paths. The content-based analysis gives the locations of sentences. For example, if the user had gestured over the same paragraph but over two distinct sentences, an embodiment of the system is able to segment the paragraph path into two more sub-paths;
3) in some cases, the user might have gestured over two distinct parts of the layout object (e.g. same sentence, same graph). If the size of this element is small enough to read when inserted into the chat window, the splitting stops here. Otherwise, an embodiment of the system further splits the remaining path when consecutive (X,Y,t) triples are far enough apart in space and time: when a user explains something, they typically pause for a little while before moving to the next area that needs explanation.

In one or more embodiments, the described segmenter produces a list of document snippets: a list of rectangular bounding boxes along with contained mouse path information.

Use of Eye-Gaze

If available, in one or more embodiments, the segmentations can be applied to eye gaze location path. The snippets obtained earlier are merged with the eye-gaze snippets. It is for example possible that a new path be added to an existing snippet where only mouse path was present. It is also possible that new snippets are added that had not been detected earlier because no mouse path was found at these locations.

In one or more embodiments, eye gaze can also be used as a pre-filtering step for the mouse locations: if no gaze is available for a fast mouse motion, this segment is removed from the cursor paths before the segmenter algorithm is applied: this allows the system to filter out non communicative cursor motion, such as when the user moves the cursor out of the way without looking at its target location.

Using Audio to Establish the Time Range of the Snippets

As would be appreciated by persons of ordinary skill in the art, users typically keep talking even after stopping their cursor; they can also start talking before moving it. Therefore, in one embodiment, the system uses voice detection to temporally trim the audio source linked to that snippet. One exemplary embodiment utilizes a client-side implementation using hark.js2, well known in the art.

Merging Back Some Snippets

In one or more embodiments, when an action spans two or more areas on a page that are too far apart, the segmenter splits them. For example in step 3, the user might circle over a part of a sentence and then again in the same sentence but far away in 2D space. The system can optionally merge back these 2 snippets by creating a single snippet separated by a visual indicator, e.g. a dashed line. This technique allows for the insertion of the snippet even when actions cover a large surface of the document page.

Figure 3:
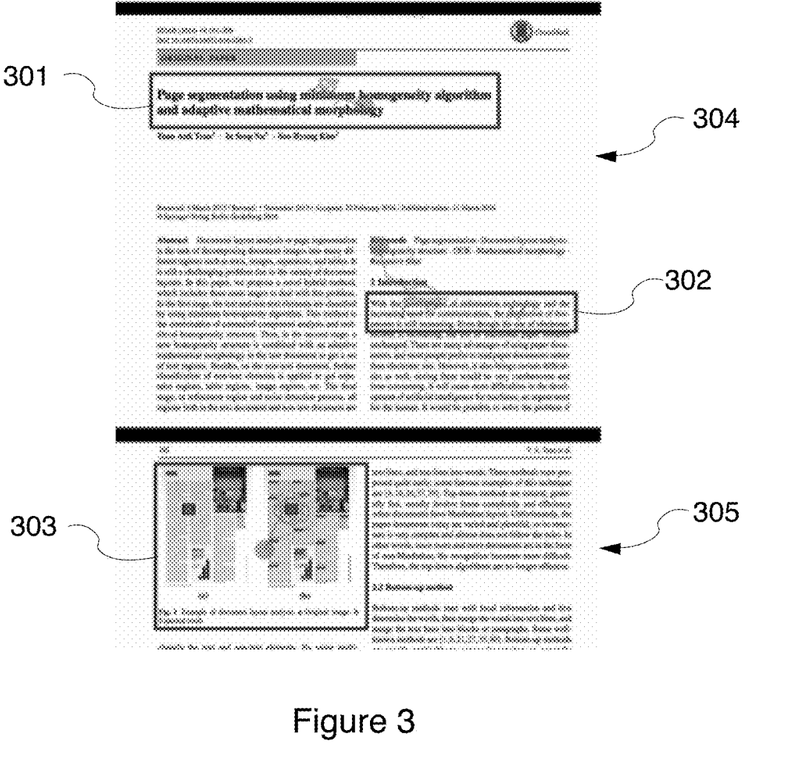
FIG. 3 illustrates a situation when the system found three snippets in two pages, one corresponds to the title (thanks to the layout analysis); the second used the layout to snap to the paragraph below introduction, as well as the content analysis to crop at the end of the sentence; the third snippet snaps to the FIG. 1.

FIG. 3 illustrates a situation when the system found three snippets 301, 302 and 303 in two pages 304 and 305, one (301) corresponds to the title (thanks to the layout analysis); the second (302) used the layout to snap to the paragraph below introduction, as well as the content analysis to crop at the end of the sentence; the third (303) snippet snaps to the FIG. 1.

Inserting Playable Snippets Into the Chat Window

In one or more embodiments, using the crop area, the system generates a static snippet of that document page and inserts it into the chat window 100. To help integrating with third-party chat systems, in one embodiment, an animated GIF or video of the snippet with accompanying mouse/voice actions can be inserted instead. In one exemplary embodiment, the user has control over what happens when a user clicks over the inserted snippet: the user then sees the played snippet using a combination of Javascript and CSS animations.

Figure 4:
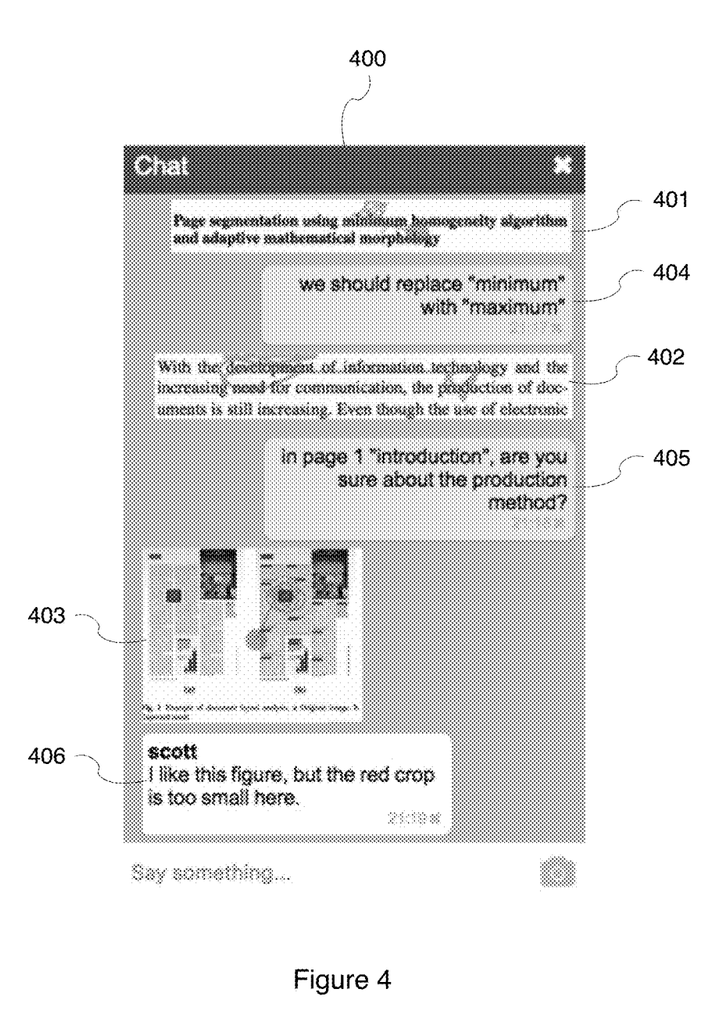
FIG. 4 illustrates an exemplary embodiment wherein three snippets, detected as shown in FIG. 3, are inserted into a chat window, allowing user to replay them inline to see and hear the comment, as well as add their own comments.

FIG. 4 shows an exemplary embodiment wherein three snippets 401, 402 and 403, detected as shown in FIG. 3, are inserted into a chat window 400, allowing user to replay them inline to see and hear the comment, as well as add their own comments. Here, they also talked using text messages 404, 405 and 406 below the respective snippets 401, 402 and 403. Clearly, the text messages 404, 405 and 406 are referencing the content, allowing the system to link them to the corresponding snippet and show these only if the user later focuses on the document. In the example shown in FIG. 4, the chat window 400 is generated inside a MixMeet conference tool, well known to persons of ordinary skill in the art.

Creation of New Snippets Inline

In one or more embodiments, snippets are inserted into the chat conversation to be played back inline. But in one embodiment, the system also allows users to "reply to" a snippet by simply moving her own cursor over it and starting to talk. This creates a new snippet inside the chat window. The creation starts when the user clicks inside the snippet and drags her cursor. When the cursor reaches one of the borders of the snippet, the snippet extends to reveal the rest of the page around that location. The same happens when the user hovers over the snippet without dragging it, allowing the person to explore more of the page area in case the intelligent crop was not so intelligent.

Figure 5:
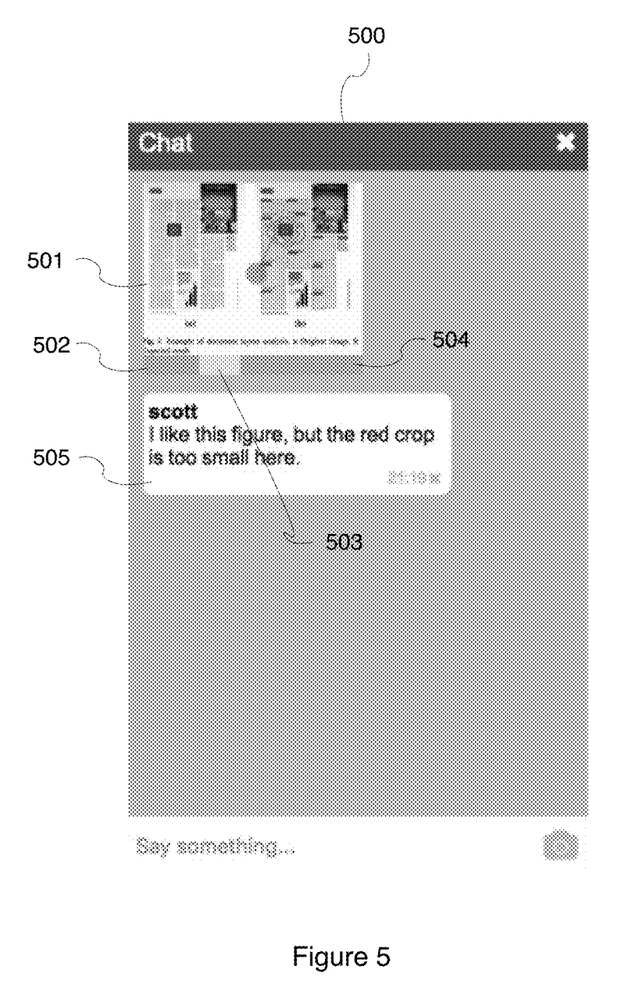
FIG. 5 illustrates an exemplary embodiment wherein the system collapses multiple user actions onto the same snippet and shows a clickable timeline below, allowing replay of each action linked to that snippet.

In one or more embodiments, when multiple users add actions over the same snippet, the system creates a new snippet for each user. Upon user's preference, the system can also collapse them onto the same snippet and show a clickable timeline below, allowing replay of each action linked to that snippet, as illustrated in FIG. 5. Specifically, in the embodiment shown in FIG. 5, two users left three comments over the same snippet 501, represented by a clickable timeline consisting of timeline portions 502, 503 and 504 below the snippet 501. When the user clock on different portions 502, 503 and 504 of the timeline below the snippet 501, different user comments (for example comment 505) are shown in the chat window 500. In one embodiment, the color of each timeline portion corresponds to the identity of the user who left the comment.

Detection and Grouping of Related Snippets and Text Messages

Figure 6:
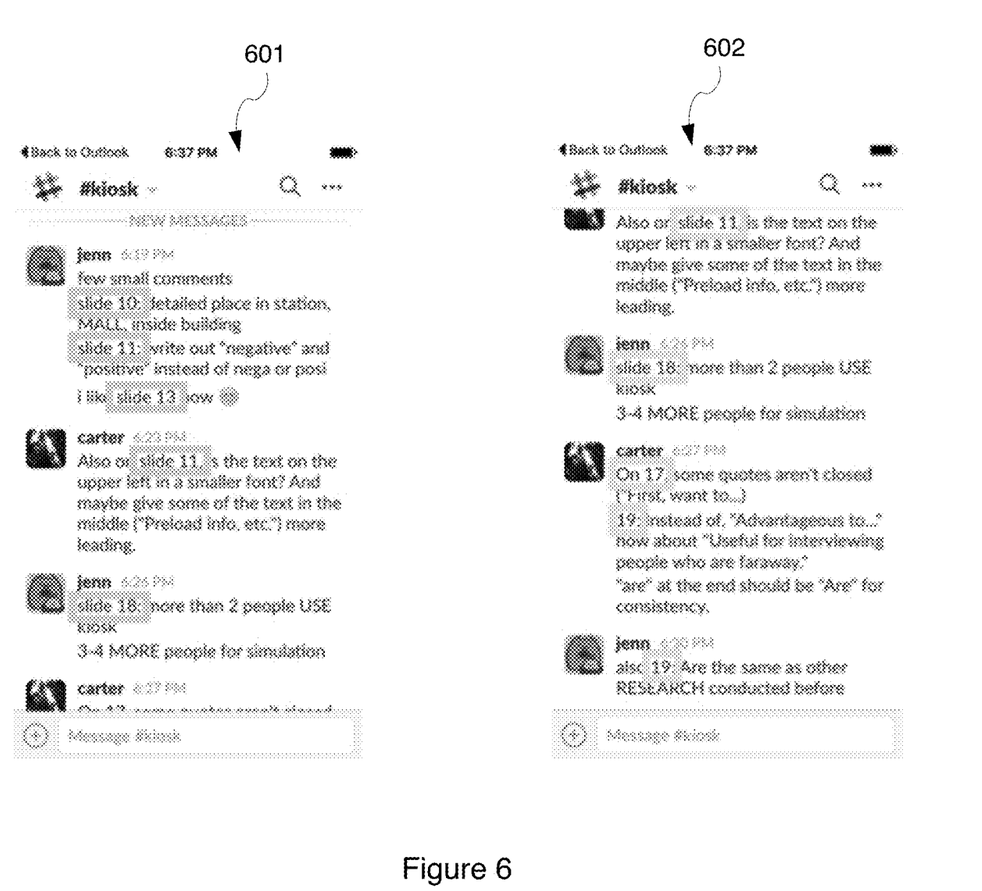
FIG. 6 illustrates detecting text messages that refer to a shared document in a chat window from a real Slack chat session.

In one or more embodiments, when the user chooses to open the snippet to see the document in full view (step 242 in flowchart 240 shown in FIG. 2), the document viewer scrolls to the corresponding page and plays that snippet. In one or more embodiments, the aforesaid document viewer is opened in a separate window from the chat window. In one or more embodiments, the system also automatically filters the chat window to show only related snippets and text messages, see step 242 of the flow chart 240 in FIG. 2. Certain examples from real chat between three coworkers are illustrated in FIG. 6. Specifically, FIG. 6 illustrates detecting text messages that refer to a shared document in a chat windows 601 and 602 from a real Slack chat session.

In one or more embodiments, the described system determines that a text message is related to a given snippet if:

The text was created after a snippet was added to the chat window or just viewed;

The text contains explicit mention of a page/slide/paragraph with a number ("slide 10", "slide 11", "slide 13", "slide 18" in the chat window 601 shown in FIG. 6) and that number is less than the number of pages in the document;

The text contains content that appears in the snippet or full document. For example, in the chat window 602 shown in FIG. 6, instead of "Advantageous to . . . " ⇒ "Useful for interviewing people who are faraway" is the content appearing in the document; or The text message was explicitly marked by the user as linked to a snippet: in one embodiment, users can drag individual messages onto a snippet to tidy up the conversation stream.

I one or more embodiments, once text messages are detected as linked to a given snippet, the described system collapses them into a single virtual message that represents them, see step 223 in the flowchart 220 shown in FIG. 2. For example, in the chat 601 shown in FIG. 6, the system would collapse the three text messages 601, 602 and 603 into one that reads "3 comments for slide 10, 11, 13, 18". Users can open the collapsed messages to read the originals. Alternatively, the users can also see them in the context of the corresponding slide when they open the document full view.

Physical Documents

The described embodiments are also useful for embedding interactions over physical documents. For example, state of the art whiteboard capture systems can lift the strokes drawn by a user as captured by a camera. On the other hand, the embodiments described herein are capable of finding snippets of the whiteboard and inserting them inside a chat window. The chat is often used as a back channel, supporting collocated peers as well as remote participants. Inserting dynamic, playable snippets from the whiteboard inside the chat conversation gives all a natural way to both archive and converse around the content being created.

In another scenario, one or more users can interact over a printed page, and an embodiment of the system lifts their hand and pen or eye gaze actions to apply the same algorithms. In one embodiment, a 3D camera is used to gather hand and finger locations over a printed document or digital surface, such as a touch screen tablet or phone. On the other hand, the segmenter described herein can use this position data and generate snippets as described above for digital documents. The generated snippets are subsequently similarly inserted into the chat window as described above.

Exemplary Computer Platform

Figure 7:
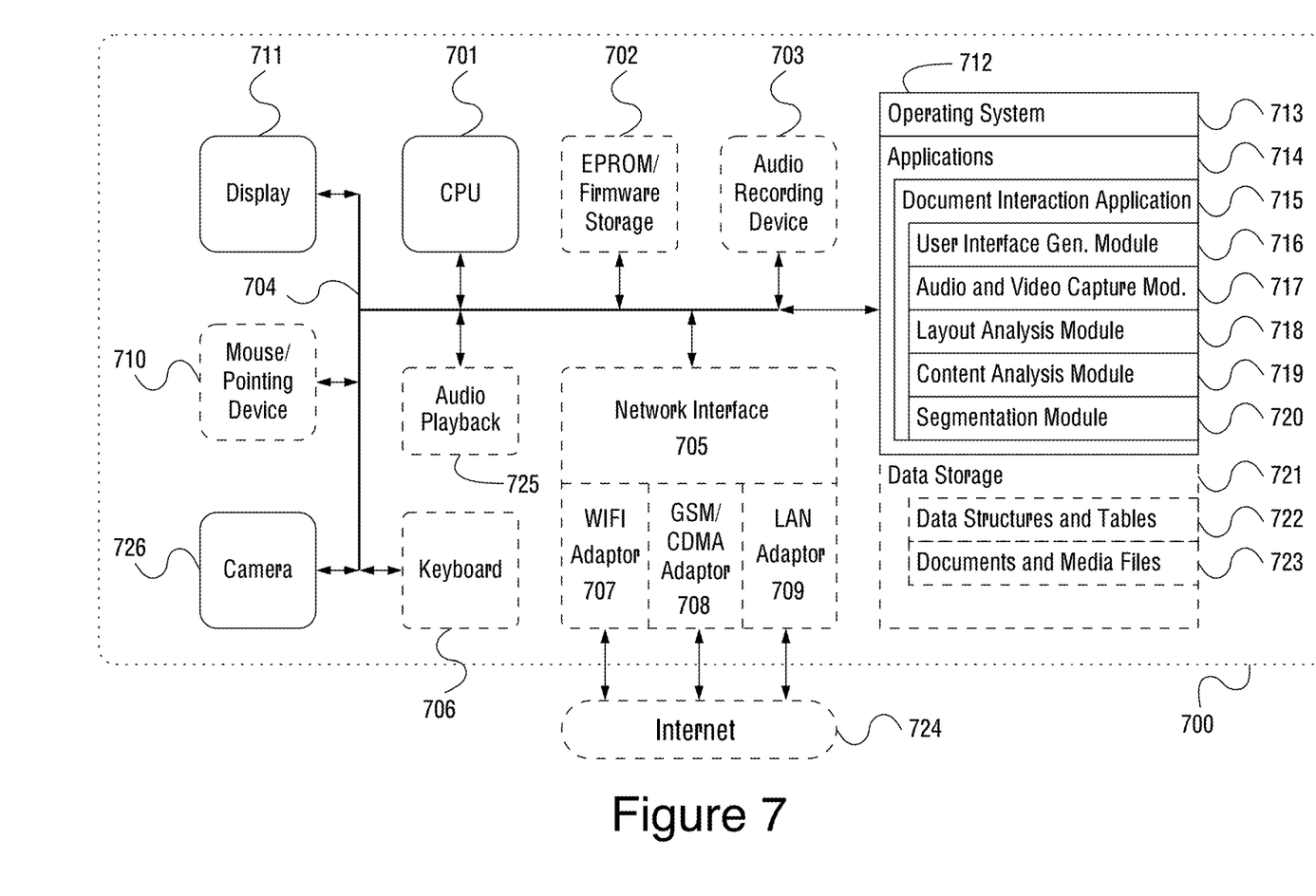
FIG. 7 illustrates an exemplary embodiment of a computerized system for enabling users to seamlessly interact with multiple document types.

FIG. 7 illustrates an exemplary embodiment of a computerized system 700 for enabling users to seamlessly interact with multiple document types. In one or more embodiments, the computerized system 700 may be implemented within the form factor of a desktop computer well known to persons of skill in the art. In an alternative embodiment, the computerized system 700 may be implemented based on a laptop or a notebook computer or any other mobile computing device, such as a smartphone or a tablet computer.

The computerized system 700 may include a data bus 704 or other interconnect or communication mechanism for communicating information across and among various hardware components of the computerized system 700, and a central processing unit (CPU or simply processor) 701 electrically coupled with the data bus 704 for processing information and performing other computational and control tasks. Computerized system 700 also includes a memory 712, such as a random access memory (RAM) or other dynamic storage device, coupled to the data bus 704 for storing various information as well as instructions to be executed by the processor 701. The memory 712 may also include persistent storage devices, such as a magnetic disk, optical disk, solid-state flash memory device or other non-volatile solid-state storage devices.

In one or more embodiments, the memory 712 may also be used for storing temporary variables or other intermediate information during execution of instructions by the processor 701. Optionally, computerized system 700 may further include a read only memory (ROM or EPROM) 702 or other static storage device coupled to the data bus 704 for storing static information and instructions for the processor 701, such as firmware necessary for the operation of the computerized system 700, basic input-output system (BIOS), as well as various configuration parameters of the computerized system 700.

In one or more embodiments, the computerized system 700 may incorporate a display device 711, which may be also electrically coupled to the data bus 704, for displaying various information to a user of the computerized system 700, such as the user interfaces showing the chat window and the document view window described above. In an alternative embodiment, the display device 711 may be associated with a graphics controller and/or graphics processor (not shown). The display device 711 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 711 may be incorporated into the same general enclosure with the remaining components of the computerized system 700. In an alternative embodiment, the display device 711 may be positioned outside of such enclosure, such as on the surface of a table or a desk. In one or more embodiments, the computerized system 700 may further incorporate an audio capture device 703, such as a microphone, configured to capture the audio of the user feedback associated with one or more snippets and store the recorded audio information in the memory 712.

In one or more embodiments, the computerized system 700 may further incorporate an audio playback device 725 electrically connected to the data bus 704 and configured to play various audio files, such as MPEG-3 files, or audio tracks of various video files, such as MPEG-4 files, which may be the audio components of the user's interaction with the snippets, as it is well known to persons of ordinary skill in the art. To this end, the computerized system 700 may also incorporate waive or sound processor or a similar device (not shown).

In one or more embodiments, the computerized system 700 may incorporate one or more input devices, such as a mouse/pointing device 710, such as a mouse, a trackball, a touchpad, or cursor direction keys for communicating direction information and command selections to the processor 701 and for controlling cursor movement on the display 711 to interact with one or more of the described snippets. This input device typically has two degrees of freedom in two axes, a first axis (e.g., x) and a second axis (e.g., y), that allows the device to specify positions in a plane.

The computerized system 700 may further incorporate a camera 726 for acquiring still images and video of various objects, including the video of the user-document interactions described herein, as well as a keyboard 706, which all may be coupled to the data bus 704 for communicating information, including, without limitation, images and video, as well as user commands (including gestures) to the processor 701.

In one or more embodiments, the computerized system 700 may additionally include a communication interface, such as a network interface 705 coupled to the data bus 704. The network interface 705 may be configured to establish a connection between the computerized system 700 and the Internet 724 using at least one of a WIFI interface 707, a cellular network (GSM or CDMA) adaptor 708 and/or local area network (LAN) adaptor 709. The network interface 705 may be configured to enable a two-way data communication between the computerized system 700 and the Internet 724. The WIFI adaptor 707 may operate in compliance with 802.11a, 802.11b, 802.11g and/or 802.11n protocols as well as Bluetooth protocol well known to persons of ordinary skill in the art. The LAN adaptor 709 of the computerized system 700 may be implemented, for example, using an integrated services digital network (ISDN) card or a modem to provide a data communication connection to a corresponding type of telephone line, which is interfaced with the Internet 724 using Internet service provider's hardware (not shown). As another example, the LAN adaptor 709 may be a local area network interface card (LAN NIC) to provide a data communication connection to a compatible LAN and the Internet 724. In an exemplary implementation, the WIFI adaptor 707, the cellular network (GSM or CDMA) adaptor 708 and/or the LAN adaptor 709 send and receive electrical or electromagnetic signals that carry digital data streams representing various types of information.

In one or more embodiments, the Internet 724 typically provides data communication through one or more subnetworks to other network resources. Thus, the computerized system 700 is capable of accessing a variety of network resources located anywhere on the Internet 724, such as remote media servers, web servers, other content servers as well as other network data storage resources. In one or more embodiments, the computerized system 700 is configured to send and receive messages, media and other data, including application program code, through a variety of network(s) including the Internet 724 by means of the network interface 705. In the Internet example, when the computerized system 700 acts as a network client, it may request code or data for an application program executing on the computerized system 700. Similarly, it may send various data or computer code to other network resources.

In one or more embodiments, the functionality described herein is implemented by computerized system 700 in response to processor 701 executing one or more sequences of one or more instructions contained in the memory 712. Such instructions may be read into the memory 712 from another computer-readable medium. Execution of the sequences of instructions contained in the memory 712 causes the processor 701 to perform the various process steps described herein. In alternative embodiments, hard-wired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 701 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to the processor 701 for execution. For example, the instructions may initially be carried on a magnetic disk from a remote computer. Alternatively, a remote computer can load the instructions into its dynamic memory and send the instructions over the Internet 724. Specifically, the computer instructions may be downloaded into the memory 712 of the computerized system 700 from the foresaid remote computer via the Internet 724 using a variety of network data communication protocols well known in the art.

In one or more embodiments, the memory 712 of the computerized system 700 may store any of the following software programs, applications or modules:

1. Operating system (OS) 713 for implementing basic system services and managing various hardware components of the computerized system 700. Exemplary embodiments of the operating system 713 are well known to persons of skill in the art, and may include any now known or later developed mobile operating systems.

2. Applications 714 may include, for example, a set of software applications executed by the processor 701 of the computerized system 700, which cause the computerized system 700 to perform certain predetermined functions, such as display the graphical user interface(s) on the display device 711 or record user interaction with various types of documents or portions thereof as described above. In one or more embodiments, the applications 714 may include an inventive application 715 for enabling users to seamlessly interact with multiple document types.

3. Data storage 721 may store, for example, the data structures and tables 722 for storing various information associated with user-document interactions, such as the audio comments, mouse pointer positions and/or chat messages referring to the documents. In addition, the data storage 721 may store one or more of the document or other media files 723 that case be used in user interaction.

In one or more embodiments, the inventive application 715 for enabling users to seamlessly interact with multiple document types incorporates a user interface generation module 716 configured to generate one or more user interfaces illustrated, for example, in FIGS. 1, 4 and 5. In addition, there may be provided a video and audio capture module 717 for capturing video and audio stream(s) using the audio capture device 703 and the camera 726. Yet additionally, there may be provided a layout analysis module 718, content analysis module 719 and segmentation module 720, having functionality described in detail above.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in various systems and methods for enabling users to seamlessly interact with multiple document types. It is intended that the specification and examples be considered as exemplary only, with a true scope and spirit of the invention being indicated by the following claims.

What is claimed is:

1. A computer-implemented method, the computer-implemented method being performed in a computerized system comprising a central processing unit and a memory, the computer-implemented method comprising:
   a. detecting a plurality of interactions by a user with at least a portion of a document, wherein the detected plurality of interactions comprise a mouse pointer hover by the user over the at least the portion of the document;
   b. analyzing a content of the document;
   c. analyzing a layout of the document;
   d. automatically generating a playable document page snippet based on the detected plurality of interactions, the analyzed document content and the analyzed document layout, automatically generating the playable document page snippet comprises:
  determining that the plurality of interactions based on, at least, a dwell time of the mouse pointer hover,
  cropping the document into the at least the portion of the document based on the determination, the analyzed document content, and the analyzed document layout, and
  generating the playable document page snippet comprising the at least the portion of the document and the detected plurality of interactions; and
e. inserting the automatically generated playable document page snippet into a conversation stream associated with the document,
wherein automatically generating the playable document page snippet further comprises clustering the detected plurality of interactions into one or more clusters based on the analyzed content and layout of the document, applying a weight to the one or more clusters based on a measure of the user's attention to each of the detected plurality of interactions, and generating the playable document page snippet based on weighting of each cluster.

2. The computer-implemented method of claim 1, wherein the detected plurality of interactions comprise a text entry by the user in connection with the document.

3. The computer-implemented method of claim 1, wherein the detected plurality of interactions comprise a voice comment by the user in connection with the document.

4. The computer-implemented method of claim 1, wherein the detected plurality of interactions comprise a gaze by the user in connection with the document.

5. The computer-implemented method of claim 4, wherein the clusters are weighted based on the gaze by the user.

6. The computer-implemented method of claim 1, wherein conversation stream associated with the document is displayed in a chat window.

7. The computer-implemented method of claim 1, wherein the automatically generated playable document page snippet is a composite snippet comprising two or more portions of the document corresponding to interactions of the user that are semantically linked.

8. The computer-implemented method of claim 1, further comprising displaying and playing the automatically generated playable document page snippet inside the conversation stream without opening a separate viewer of the document.

9. The computer-implemented method of claim 1, further comprising enabling the user to reply to the automatically generated playable document page snippet inside the conversation stream without opening a separate viewer for the document.

10. The computer-implemented method of claim 1, further comprising grouping together the automatically generated playable document page snippet and corresponding detected plurality of interactions of the user in connection with the document.

11. The computer-implemented method of claim 1, further comprising filtering related snippets and corresponding detecting plurality of interactions of a user when the user focuses on a viewer of the document.

12. The computer-implemented method of claim 1, wherein interactions from a plurality of users over a same page area of the document are grouped using an overlay resulting in a single snippet comprising the interactions of the plurality of users.

13. The computer-implemented method of claim 1, wherein the detected plurality of interactions is a pointer motion by the user over at least a portion of the document, wherein the pointer motion is smoothed when the pointer motion is acquired at low sampling rate and wherein the smoothing comprises inserting fake text cursors based on an underlying text connected components or document object model of the document.

14. The computer-implemented method of claim 1, further comprising detecting an interaction with the inserted playable document page snippet by another user and generating a new playable document page snippet based on the detected interaction, the new playable document page snippet comprising the detected interaction of the another user.

15. The computer-implemented method of claim 14, wherein the new playable document page snippet comprises the interactions by the user and the another user.

16. The computer-implemented method of claim 15, wherein the interactions by the user and the another user are represented in the new playable document page snippet by a selectable timeline comprising a plurality of portions displayed below the new playable document page snippet, each portion corresponding to one of the interactions.

17. The computer-implemented method of claim 1, wherein the detected plurality of interactions comprise one or more of a mouse, text, voice, gaze, and input events performed by the user via an input device coupled to the computerized system.

18. The computer-implemented method of claim 1, wherein the playable document page snippet comprises a playable video, wherein the video is playable from within the conversation stream.

19. A non-transitory computer-readable medium embodying a set of computer-executable instructions, which, when executed in connection with a computerized system comprising a central processing unit and a memory, cause the computerized system to perform a method comprising:
  a. detecting a plurality of interactions by a user with at least a portion of a document, wherein the detected plurality of interactions comprise a mouse pointer hover by the user over the at least the portion of the document;
  b. analyzing a content of the document;
  c. analyzing a layout of the document;
  d. automatically generating a playable document page snippet based on the detected plurality of interactions, the analyzed document content and the analyzed document layout, automatically generating the playable document page snippet comprises:
    determining that the plurality of interactions based on, at least, a dwell time of the mouse pointer hover,
    cropping the document into the at least the portion of the document based on the determination, the analyzed document content, and the analyzed document layout, and
    generating the playable document page snippet comprising the at least the portion of the document and the detected plurality of interactions; and
  e. inserting the automatically generated playable document page snippet into a conversation stream associated with the document,
  wherein automatically generating the playable document page snippet further comprises clustering the detected plurality of interactions into one or more clusters based on the analyzed content and layout of the document, applying a weight to the one or more clusters based on a measure of the user's attention to each of the detected plurality of interactions, and generating the playable document page snippet based on weighting of each cluster.

20. The non-transitory computer-readable medium of claim 19, wherein the detected plurality of interactions comprise a text entry by the user in connection with the document.

21. The non-transitory computer-readable medium of claim 19, wherein the detected plurality of interactions comprise a voice comment by the user in connection with the document.

22. The non-transitory computer-readable medium of claim 19, wherein the detected plurality of interactions comprise a gaze by the user in connection with the document.

23. The non-transitory computer-readable medium of claim 19, wherein conversation stream associated with the document is displayed in a chat window.

24. A computerized system comprising a central processing unit and a memory, the memory storing a set of computer-readable instructions causing the computerized system to perform a method comprising:
  a. detecting a plurality of interactions by a user with at least a portion of a document, wherein the detected plurality of interactions comprise a mouse pointer hover by the user over the at least the portion of the document;
  b. analyzing a content of the document;
  c. analyzing a layout of the document;
  d. automatically generating a playable document page snippet based on the detected plurality of interactions, the analyzed document content and the analyzed document layout, automatically generating the playable document page snippet comprises:
    determining that the plurality of interactions based on, at least, a dwell time of the mouse pointer hover,
    cropping the document into the at least the portion of the document based on the determination, the analyzed document content, and the analyzed document layout, and
    generating the playable document page snippet comprising the at least the portion of the document and the detected plurality of interactions; and
  e. inserting the automatically generated playable document page snippet into a conversation stream associated with the document,
  wherein automatically generating the playable document page snippet further comprises clustering the detected plurality of interactions into one or more clusters based the analyzed content and layout of the document, applying a weight to the one or more clusters based on a measure of the user's attention to each of the detected plurality of interactions, and generating the playable document page snippet based on weighting of each cluster.

* * * * *